United States Patent [19]
Okamoto et al.

[11] Patent Number: 5,893,407
[45] Date of Patent: Apr. 13, 1999

[54] AIR CONDITIONER

[75] Inventors: Akira Okamoto, Okazaki; Hiroyuki Yamaguchi, Aichi-gun, both of Japan

[73] Assignee: Nippondenso Co., Ltd., Japan

[21] Appl. No.: 08/948,059

[22] Filed: Oct. 9, 1997

Related U.S. Application Data

[63] Continuation of application No. 08/620,609, Mar. 22, 1996, abandoned.

[30] Foreign Application Priority Data

| Mar. 23, 1995 | [JP] | Japan | 7-064116 |
| Apr. 17, 1995 | [JP] | Japan | 7-091088 |
| Apr. 18, 1995 | [JP] | Japan | 7-092806 |
| Apr. 24, 1995 | [JP] | Japan | 7-098868 |
| Jul. 6, 1995 | [JP] | Japan | 7-171069 |
| Jul. 12, 1995 | [JP] | Japan | 7-175894 |

[51] Int. Cl.$^6$ ............................ F25B 29/00; B60H 1/00
[52] U.S. Cl. ............... 165/42; 165/43; 165/103; 454/69; 237/12.3 A; 251/175; 251/901; 137/872
[58] Field of Search ............... 165/42, 43, 202; 454/121, 126, 156, 69; 237/12.3 A, 12.3 B; 251/175, 901, 326, 356, 333; 137/872, 625.33

[56] References Cited

U.S. PATENT DOCUMENTS

| 2,101,991 | 12/1937 | Finley et al. | 251/175 |
| 3,381,706 | 5/1968 | Hendey | 251/901 |
| 4,084,616 | 4/1978 | Tragert | 251/901 |
| 4,164,211 | 8/1979 | Onnen | 251/175 |
| 4,546,617 | 10/1985 | Suzuki et al. | 165/43 |
| 5,062,473 | 11/1991 | Ostrand et al. | 165/43 |
| 5,080,140 | 1/1992 | Ostrand et al. | |
| 5,105,730 | 4/1992 | Smith | 251/901 |
| 5,162,020 | 11/1992 | Asamo et al. | 165/103 |
| 5,551,667 | 9/1996 | Galka et al. | 454/69 |

FOREIGN PATENT DOCUMENTS

| 0 449 205 A1 | 10/1991 | European Pat. Off. |
| 2-15508 | 1/1990 | Japan |
| 6-71222 | 10/1994 | Japan |

*Primary Examiner*—John K. Ford
*Attorney, Agent, or Firm*—Pillsbury Madison & Sutro, LLP

[57] ABSTRACT

According to the present invention, in an air conditioner for a vehicle, when the cool air passage is opened, the sliding door slides so as to incline with respect to the flowing direction of the cool air in such a manner that an end portion of the sliding door at a side of said cool air passage is located at the most air downstream side. That is, when the sliding door is controlled to fully open the cool air passage (i.e., the warm air passage is fully closed), for example, in the maximum cool mode, the sliding door slides while inclining with respect to the flowing cool air. In this operation, the air is blocked from flowing into the warm air passage, and such air is smoothly guided into the cool air by the sliding door, because the sliding door inclines with respect to the flowing direction of cool air, thus increasing the amount of cool air into the passenger compartment.

1 Claim, 6 Drawing Sheets

AIR CONDITIONER

This is a continuation of application Ser. No. 08/620,609, filed on Mar. 22, 1996, which was abandoned.

CROSS REFERENCE TO RELATED APPLICATIONS

This application is based on and claims priority of Japanese Patent Applications No. Hei 7-64116 filed on Mar. 23, 1995, No. Hei 7-91088 filed on Apr. 17, 1995, No. Hei 7-92806 filed on Apr. 18, 1995, No. Hei 7-98868 filed on Apr. 24, 1995, No. Hei 7-171069 filed on Jul. 6, 1995, and No. Hei 7-175894 filed on Jul. 12, 1995, the content of which are incorporated herein by reference.

BACKGROUND OF THE INVENTION

1. Field of the Invention

The present invention relates to an air conditioner for a vehicle.

2. Description of Related Art

In a conventional air conditioning unit for a vehicle as shown in Japanese Utility Model Laid-Open No. Hei 2-15508, a plate-shaped sliding door as an air mixing door slides in a direction crossing the cool air and warm air passages to adjust the mixing ratio of the cool air and the warm air. In such an air conditioning unit for a vehicle, it is necessary to fully close the cool or warm air passage with the sliding door in the maximum cool mode where no air is sent to the heater core and in the maximum hot mode where all of the air having passed through the evaporator bypasses the heater core, and therefore, the cross sectional area of the cool air passage is set to be equal to that of the warm air passage.

In an air conditioning unit for a vehicle, there has been a demand to increase an amount of blowing air as much as possible in the maximum cool mode to improve cooling performance especially in summer. However, according to the air conditioning unit in the above-described Japanese Utility Model Publication, the amount of blowing air is restricted by the sliding door, because the surface at the air upstream side of the sliding door extends perpendicularly with respect to the flowing direction of the air passing through the evaporator in the maximum cool mode.

SUMMARY OF THE INVENTION

In light of the above-described problem, the present invention has an object to provide an automotive air conditioner, for adjusting the ratio of the amount of cool and warm air with a sliding door, capable of increasing the amount of blowing air in the maximum cool mode.

According to the present invention, when the cool air passage is opened, the sliding door slides so as to incline with respect to the flowing direction of the cool air in such a manner that an end portion of the sliding door at a side of said cool air passage is located at the most air downstream side. That is, when the sliding door is controlled to fully open the cool air passage, for example, in the maximum cool mode, the sliding door slides while inclining with respect to the flowing cool air. In this operation, the air is blocked from flowing into the warm air passage, and such air is smoothly guided into the cool air by the sliding, because the sliding door inclines with respect to the flowing direction of cool air, thus increasing the amount of cool air into the passenger compartment.

Other objects and features of the invention will appear in the course of the description thereof, which follows.

BRIEF DESCRIPTION OF THE DRAWINGS

Additional objects and advantages of the present invention will be more readily apparent from the following detailed description of a preferred embodiment thereof when taken together with the accompanying drawings in which.

DETAILED DESCRIPTION OF THE PRESENTLY PREFERRED EXEMPLARY EMBODIMENT

The preferred embodiment of the present invention is hereinafter described with reference to the accompanying drawings.

Figure 1:
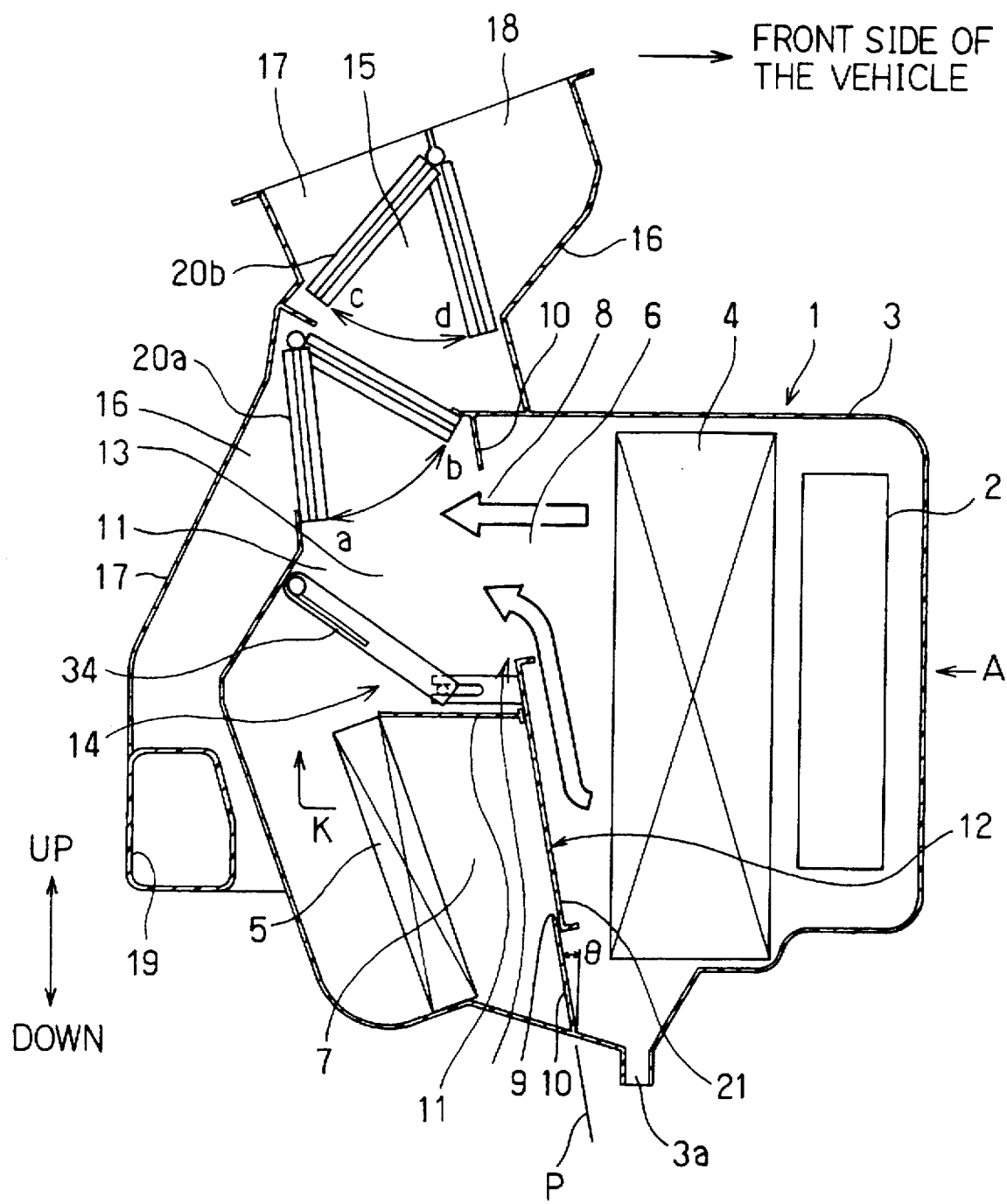
FIG. 1 is a cross-sectional view of the general construction of a first embodiment of the present invention in a maximum cool mode.

Referring to FIG. 1, an air conditioning unit 1 of an air conditioner for an automobile is located below an instrument panel in a passenger compartment, and includes an air inlet opening 2. A blowing unit (not shown) is provided below the instrument panel before a passenger's seat next to the driver's seat to blow air to the air inlet opening 2.

As known well, the blowing unit includes an inside/outside air selector box for selectively introducing the air inside the compartment (inside air) or the air outside the compartment (outside air), and a centrifugal multi-vane blower.

A resin case 3 of the air conditioning unit 1 is located below the instrument panel at a substantially central position in the lateral direction of the passenger compartment. An evaporator 4 as air cooling means is located at an upstream position in the airflow direction in the case 3, and a heater core 5 as air heating means is located in a lower position on a downstream side in the airflow direction.

Further, a cool air passage 6 for allowing the air cooled by the evaporator 4 to bypass the heater core 5 is formed in the case 3 in an upper position on a downstream side of the evaporator 4 (in a position above the heater core 5).

The evaporator 4 is a cooler forming a refrigerating cycle in combination with a compressor, a condenser, a receiver, and a pressure reducing device (all not shown) as known, and dehumidifies and cools the air in the case 3. The compressor is driven by an automotive engine via an electromagnetic clutch (not shown). The heater core 5 is a heater using a cooling water for the automotive engine as a heat source, for reheating the air cooled by the evaporator 4.

At a downstream side of the evaporator 4 in the case 3, there are formed an opening 8 for cool air at the inlet of the cool air passage 6 and an opening 9 for heating at the inlet of a warm air passage 7 leading to the heater core 5, for introducing the cool air having passed through the evaporator 4 to each passage 6 and 7.

As shown in FIG. 1, the opening 8 for cool air and the opening 9 for heating open on the same plane "p", and these openings 8 and 9 are defined by a projection wall 10 projecting from an inside wall of the case 3 and a partition wall 11 located at a substantially central position in the case 3.

The opening 8 for cool air and the opening 9 for heating have substantially rectangular shapes as viewed in the direction of the arrow A in FIG. 1, and these openings 8 and 9 are vertically juxtaposed.

The partition wall 11 horizontally extends from the intermediate position between the two openings 8 and 9 in the downstream direction, so as to partition the cool air passage 6 and the warm air passage 7 from each other. Accordingly, the air introduced from the opening 9 for heating into the warm air passage is wholly sent to the heater core 5. Further, the air introduced from the opening 8 for cool air into the cool air passage 6 wholly bypasses the heater core 5.

At a downstream side of the evaporator 4 and an upstream side of the opening 8 for cool air and the opening 9 for heating, there is provided a sliding door 12 for adjusting the amounts of air to be set to the cool air passage 6 and the warm air passage 7. The detail of the sliding door 12 will be described later.

At a downstream of the cool air passage 6 and the warm air passage 7, there is provided an air mixing chamber portion (a cool air/warm air mixing chamber) 13 for mixing the cool air having passed through the cool air passage 6 and the warm air having passed through the warm air passage 7. In the air mixing chamber portion 13, the cool air flowing through the cool air passage 6 and the warm air flowing through the warm air passage 7 are mixed together to thereby obtain a desired temperature of conditioned air.

A link mechanism 14 for operating the sliding door 12 is provided at a position between the cool air passage 6 and the air mixing chamber portion 13 in the space defined in the case 3. The link mechanism 14 also serves to adjust the flow directions of the cool air and the warm air respectively flowing through the cool air passage 6 and the warm air passage 7. The detail of the link mechanism 14 will be described later in relation to the sliding door 12.

At a downstream side of the air mixing chamber portion 13 in the case 3, there are formed two branched air outlet passages 15 and 16. As shown in FIG. 1, the passage 15 extends upward. At a downstream side of the passage 15, there are provided a face air outlet passage 17 connected to a face air outlet (not shown) for blowing conditioned air toward the upper half of the body of a passenger in the passenger compartment and a defroster air outlet passage 18 connected to a defroster air outlet (not shown) for blowing conditioned air toward the inside surface of the windshield glass of the vehicle.

On the other hand, the other passage 16 extends downward and is connected at its downstream end to a foot air outlet 19 for blowing conditioned air toward the lower half of the body of the passenger.

At a branched portion between the two passages 15 and 16, there is provided a first selector door 20a for selecting whether the air conditioned in the case 3 is to be set to the passage 15 or is to be sent to the passage 16. When the first selector door 20a is in a rotational position shown by "a" in FIG. 1, the conditioned air is wholly supplied to the passage 15, whereas when the first selector door 20a is in another rotational position shown by "b" in FIG. 1, the conditioned air is wholly supplied to the passage 16 and blown from the foot air outlet 19.

Further, a second selector door 20b is located just downstream of the passage 15, so as to select whether the conditioned air sent to the passage 15 is to be supplied to the face air outlet passage 17 or is to be supplied to the defroster air outlet passage 18. More specifically, when the first selector door 20a is in the rotational position "a" and the second selector door 20b is in a rotational position shown by "c" in FIG. 1, the conditioned air is supplied to the defroster air outlet passage 18. Conversely, when the first selector door 20a is in the rotational position "a" and the second selector door 20b is in another rotational position shown by "d" in FIG. 1, the conditioned air is supplied to the face air outlet passage 17.

The plane "P", to which the openings for cool and warm air 8 and 9 are open, inclines by a predetermined angle θ with respect to the perpendicular line. The upper portion of the plane "P" inclines in the direction away from evaporator 4.

Thus, the upper portion of sliding door 12 inclines toward the air downstream side and is designed to slide perpendicularly. It is preferable to set the inclining angle θ between the plane "P" and sliding door 12 in the range of approximately 5–30° in consideration of a limited space for installing the door 12.

Figure 7:
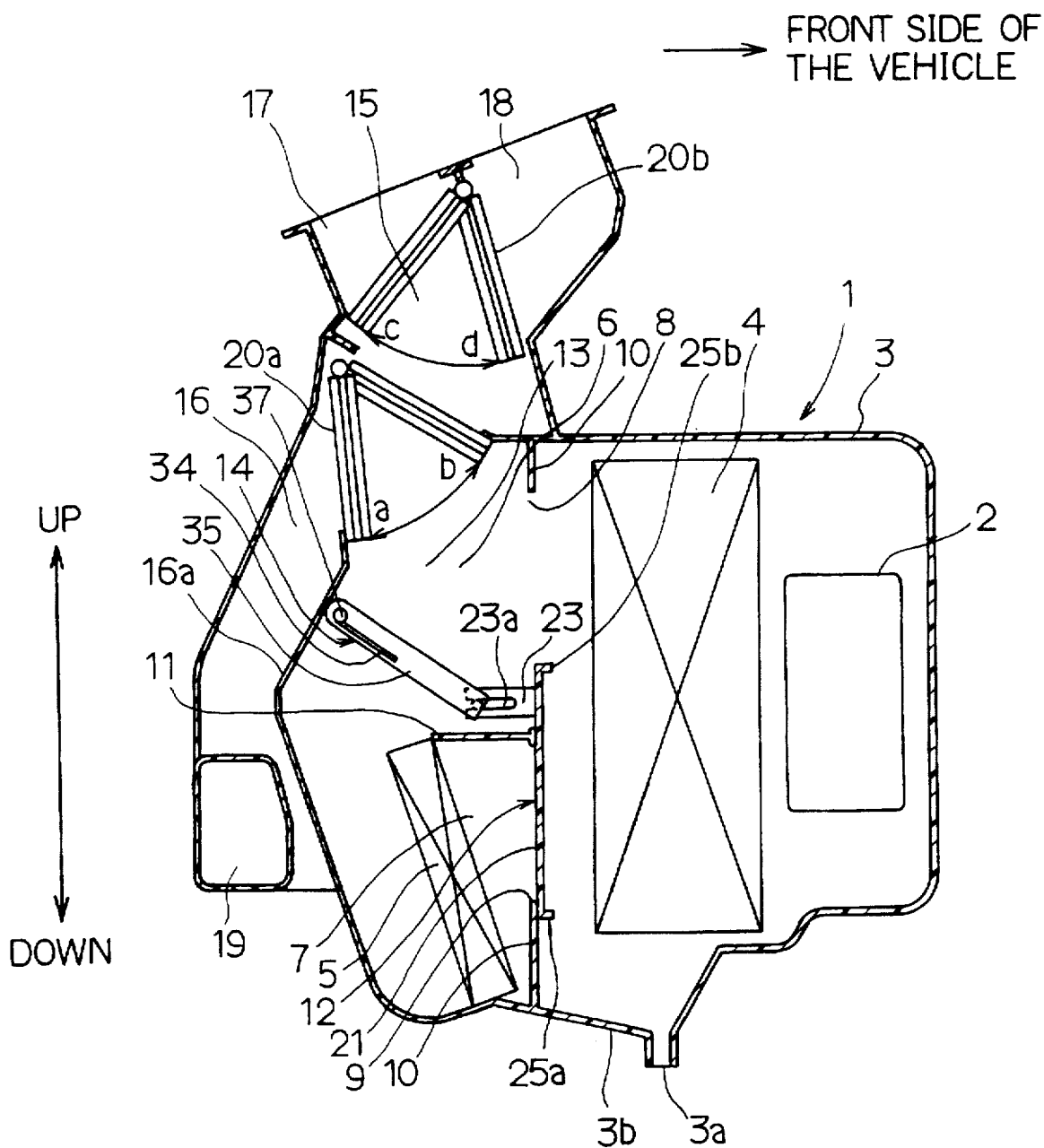
FIG. 7 is a cross-sectional view of the general construction of a comparison in a maximum cool mode.

A drain 3a for draining condensed water generating in the evaporator 4 is integrally molded with the case 3 of the air conditioning unit 1 below the evaporator 4. An inclining surface 3b in FIG. 7 is also integrally molded with the bottom of case 3 below sliding door 12 and includes a down slope toward the drain 3a.

The sliding door 12 and the link mechanism 14 will now be described in detail.

Figure 2:
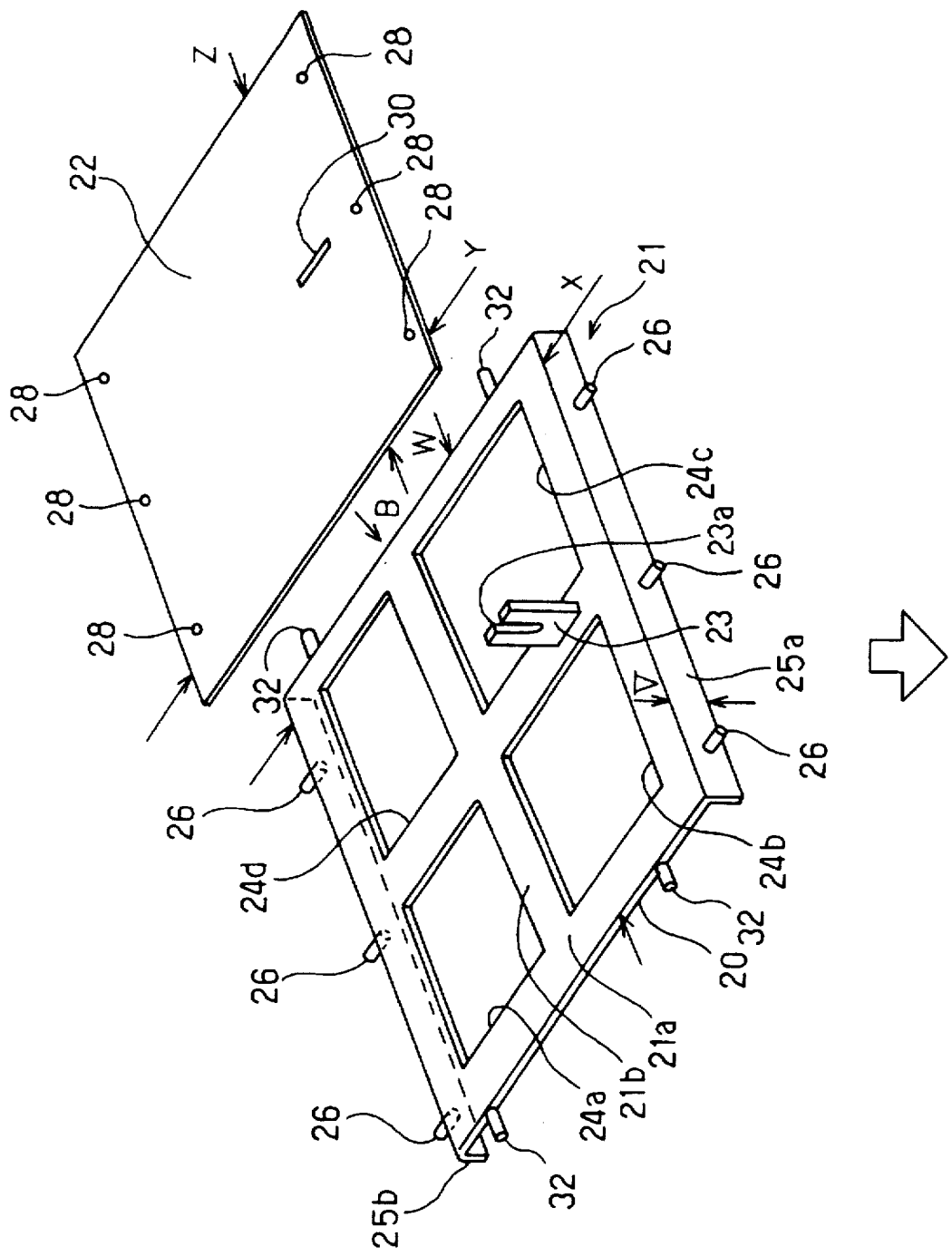
FIG. 2 is an exploded perspective view of the supporting and film members of the sliding door in FIG. 1.
Figure 3:
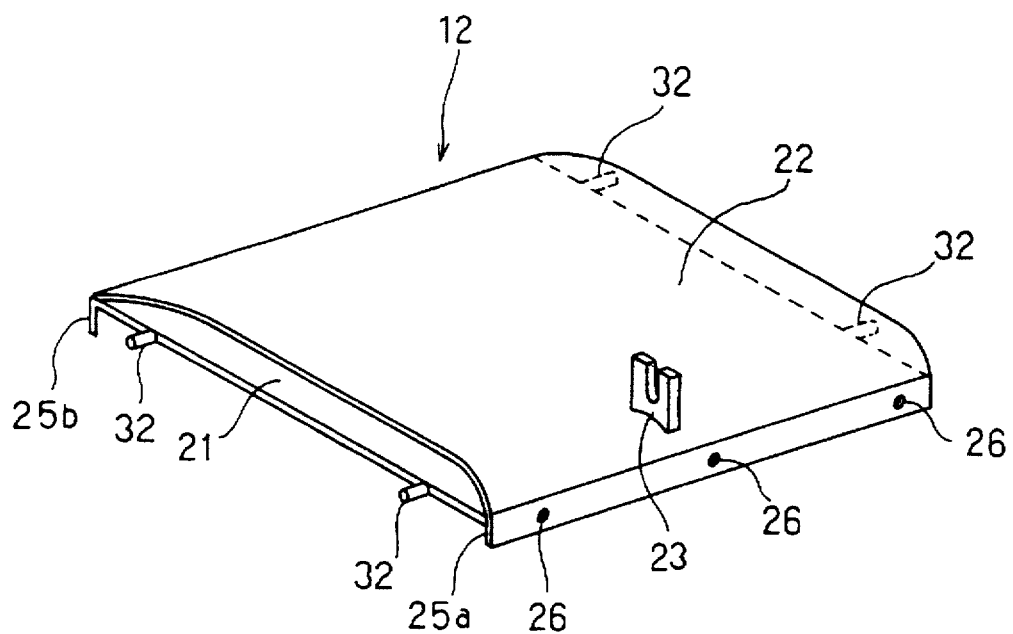
FIG. 3 is a perspective view illustrating the condition when the supporting and film members in FIG. 2 are installed.
Figure 4:
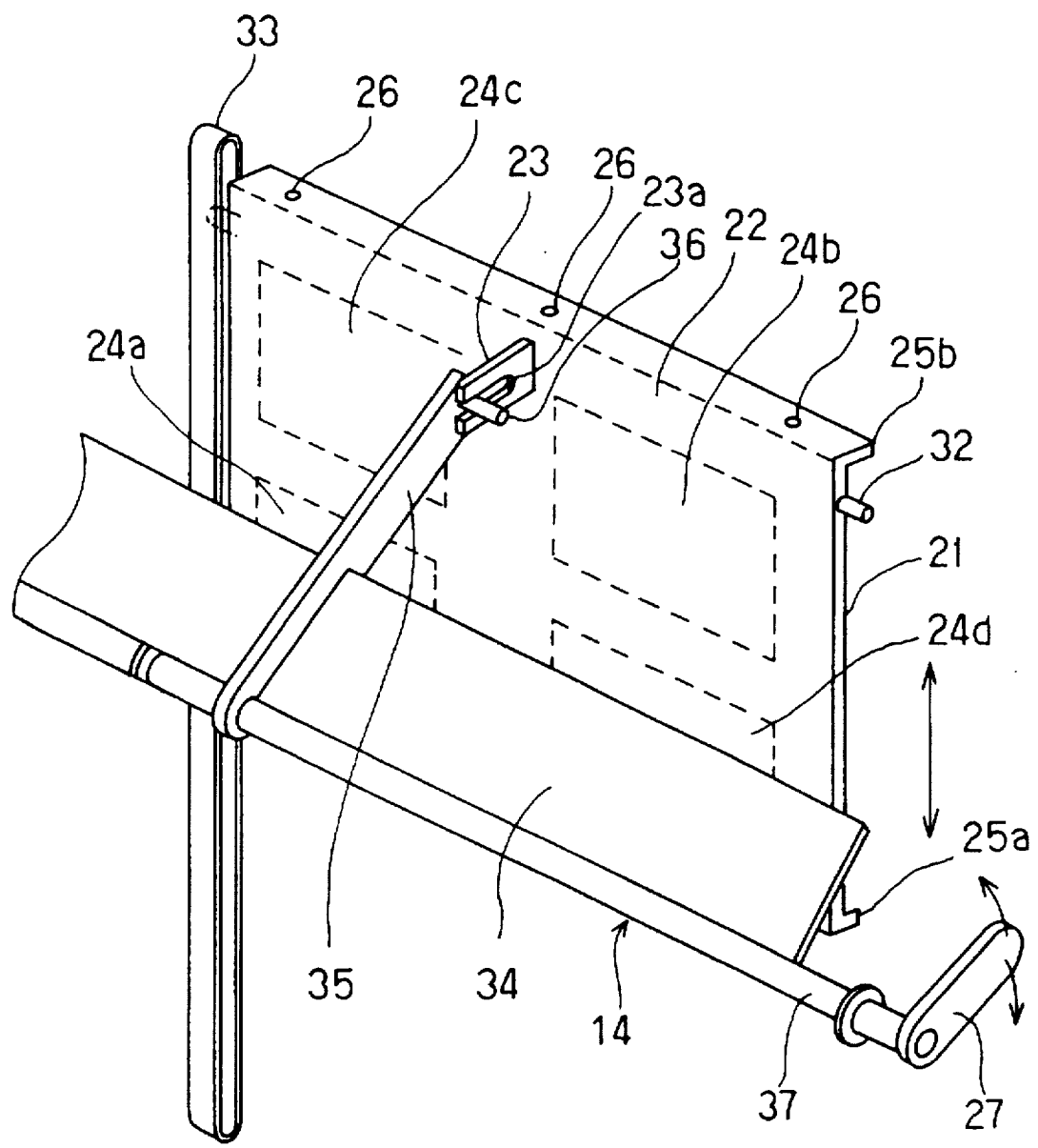
FIG. 4 is a perspective view illustrating the condition when the sliding door is installed and contained in the case.

FIG. 2 is an exploded perspective view of the sliding door 12. FIG. 3 is a perspective view of the sliding door 12 in an assembled condition. FIG. 4 is a perspective view of the sliding door 12 mounted within the case 3.

The sliding door 12 includes a support member 21 and a film member 22 provided so as to cover one plane portion 21a on the downstream side of the support member 21.

The support member 21 is made of a resin material such as polypropylene, and has a substantially rectangular outer shape. As shown in FIG. 2, the support member 21 is formed with four rectangular through-holes (openings) 24a to 24d, so that the support member 21 is configured like a lattice-shaped framework and has a cross-shaped supporting portion 21b.

The support member 21 is integrally formed with mounting portions 25a and 25b bent substantially perpendicularly from the one plane portion 21a at the opposite ends (at the front end and the rear end as viewed in FIG. 2) over the entire lengths thereof. The outer surface of each of the mounting portions 25a and 25b is integrally formed with a plurality of columnar projections 26 (three projections 26 is shown in FIG. 2) arranged at equal intervals. As will be described later, the mounting portions 25a and 25b are provided to mount the film member 22 on the support member 21. As shown in FIGS. 1 and 4, the mounting portions 25a and 25b are respectively formed at the lower end and the upper end of the sliding door 12.

The laterally opposite end surfaces of the support member 21 as viewed in FIG. 2 are integrally formed with a plurality of (two for each end surface) columnar holding portions 32 projecting sidewards from the end surfaces for movably holding the support member 21 within the case 3. Further, a lever member 23 having a U-shaped recess 23a is formed on the upper surface (a surface facing the cool air passage 6 in FIG. 1) of the supporting portion 21b of the support member 21. As shown in FIG. 1, the lever member 23 is formed so as to project from the one plane portion 21a on the downstream side of the support member 21 to the air downstream side.

The film member 22 is formed preferably of a resin material having flexibility but no air permeability, and having a small frictional resistance. More specifically, the film member 22 is made of a resin film of polyethylene terephthalate having a thickness of 75 µm, for example, and has a substantially rectangular shape.

With regard to the size of the film member 22, the width Z of the film member 22 is equal to the width W of the support member 21. The height Y of the film member 22 is larger by a predetermined length than the sum of the height X of the support member 21 and the total width of the mounting portions 25a and 25b (twice as long as the width "V" shown in FIG. 2).

At each longitudinal end portion of the film member 22, there are formed a plurality of mounting holes 28 arranged at equal intervals which are the same as the intervals of the plural projections 26 formed at each longitudinal end of the support member 21. Further, the film member 22 is formed with an insert hole 30 into which the lever member 23 of the support member 21 is inserted.

When the film member 22 is mounted on the support member 21, the three mounting holes 28 arranged at equal intervals at one end portion of the film member 22 are fitted (or loosely fitted) into the three projections 26 arranged at equal intervals at one end of the support member 21. Thereafter, the lever member 23 of the support member 21 is inserted into the insert hole 30, and the other three mounting holes 28 at the other end of the film member 22 are fitted (or loosely fitted) with the other three projections 26 at the other end of the support member 21. Thereafter, all the projections 26 are melted by using a heating device (not shown), for example, to thereby thermally bond the film member 22 to the mounting portions 25a and 25b of the support member 21. Thus, the film member 22 is fixed to the support member 21. FIG. 3 shows the condition after film member 22 is mounted on the support member 21.

As mentioned above, the width Z of the film member 22 is so set as to satisfy the relation of Z=W. Therefore, as shown in FIG. 3, the lateral width (the size shown by "E" in FIG. 3) of the film member 22 is equal to that of the support member 21, and the two members 21 and 22 are just overlapped each other. On the other hand, the longitudinal height (the size shown by "F" in FIG. 3) of the film member 22 is larger than that of the support member 21. Therefore, the film member 22 fixed to the support member 21 is in a flexed condition such that a space is defined between the one plane portion 21a of the support member 21 and the film member 22.

A mounting structure of the support member 21 and the film member 22 within the case 3 will now be briefly described.

The resin case 3 shown in FIG. 1 is configured by integrally connecting two divided case members on the front side and the back side of the sheet of FIG. 1 by means of metal clips or screws. As shown in FIG. 3, a guide groove 33 having a sectionally elongated shape is formed on the inner wall of each case member of the case 3 so as to extend in the vertical direction of the case 3. Although the single guide groove 33 located on the back side of the sheet of FIG. 1 is shown in FIG. 4, two guide grooves 33 are actually provided at opposed positions on the inner walls of the two divided case members of the case 3.

Each guide groove 33 extends in a direction substantially perpendicular to the direction of air flow in the case 3; however, the opening 8 for cool air and the opening 9 for heating have to be in parallel with plane "P", so that guide groove 33 inclines toward the air downstream side with the same inclination angle θ as plane "P". Further, each guide groove 33 is formed at a position at the upstream side of the opening 8 for cool air and the opening 9 for heating in the vicinity of these openings 8 and 9.

The holding portions 32 of the support member 21 at its one lateral end are inserted into the guide groove 33 of one of the case members, and the holding portions 32 of the support member 21 at the other lateral end are similarly inserted into the guide groove 33 of the other case member. Then, the support member 21 is accommodated into the case 3 in such a manner as to be held between the two case members, and is supported slidably along the guide grooves 33.

In this accommodated condition, the one plane portion 21a of the support member 21 extends in a direction substantially perpendicular to the direction of air flow in the case 3 (i.e., in a direction crossing the air flow), and the support member 21 is movable along the guide grooves 33. Accordingly, the support member 21 is constantly movable in the direction where the guide grooves 33 extend. As shown in FIG. 4, the mounting portions 25a and 25b are formed at the opposite ends of the support member 21 with respect to the moving direction thereof.

Now, the link mechanism 14 will be described in detail with reference to FIG. 4.

The link mechanism 14 has a drive shaft 37 pivotably supported at its opposite ends to the case 3. The drive shaft 37 is made of a resin material such as polypropylene. The drive shaft 37 is so located as to extend horizontally (in the lateral direction of the vehicle) at the air mixing chamber portion 13 in the case 3. The drive shaft 37 is integrally formed with an air guide plate 34 for adjusting the direction of air flow at the air mixing chamber portion 13 in the case 3, and also formed with a lever member 35. The lever member 35 is connected at its one end to the drive shaft 37, and extends from this connected portion with the drive shaft 37 toward the lever member 23 of the support member 21. The other end of the lever member 45 is engaged with a U-shaped recess 23a of the lever member 23 of the support member 21.

The air guide plate 34 is a rectangular plate-like member elongated along the axial direction of the drive shaft 37. The air guide plate 34 is rotated together with the drive shaft 37 to change its rotational position.

The lever member 35 is formed at almost middle portion of the driving shaft 37 in the axial direction thereof. A columnar engaging portion 36 is integrally formed with the lever member 35 at one end and is rotatably inserted into the recess 23a of the lever member 23 of support member 21.

In this way, the air guide plate 34 and the lever member 35 are rotated together about the axis of the drive shaft 37 as the rotation of the drive shaft 37. Accordingly, the position of the engaging portion 36 of the lever member 35 is moved vertically as viewed in FIG. 4. This vertical movement of the engaging portion 36 is transmitted via the lever member 23 to the support member 21, thereby moving the support member 21 along the guide grooves 33 in the vertical direction as viewed in FIG. 4 (in the direction substantially perpendicular to the direction of air flow in the case 3).

A driving mechanism for the drive lever 27 may be a known structure. The driving mechanism for rotating the drive lever 27 may be configured by transmitting a manual operation force applied to the temperature control lever 41 on an air conditioning control panel (not shown) provided at an instrument panel in the passenger compartment to the drive lever 27 via the control cable 42.

In this embodiment, the driving mechanism is configured as shown in FIG. 1 by providing a manually operable temperature control lever 41, and connecting the temperature control lever 41 to the drive lever 27 via a control cable 42.

The above mechanism for rotating the drive lever 27 may be replaced by another mechanism for rotating the drive lever 27 by an actuator such as a servo motor adapted to be automatically controlled by an air conditioning control device.

An operation of the above-constructed present embodiment is described. First, an operation in a maximum cool mode (maximum cooling operation) as shown in FIG. 5 will be described.

Figure 5:
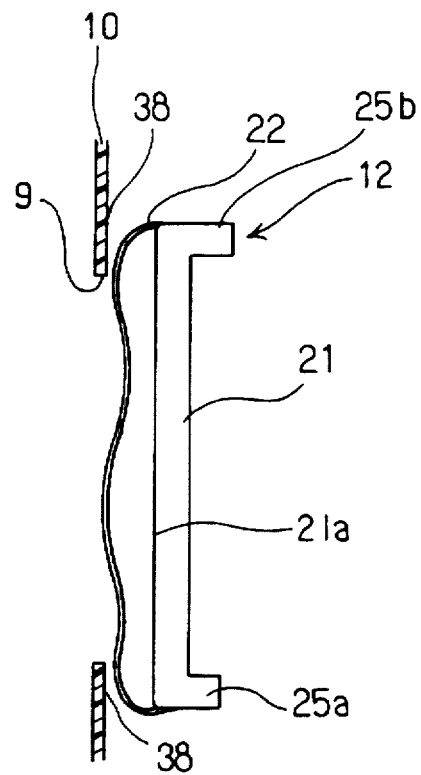
FIG. 5 is a partial structural view illustrating the condition of the film member when the blower is not operated.

In the operational condition shown in FIG. 5, the support member 21 and the film member 22 are in a lowermost operational position. In this operational position, the opening 8 for cool air is fully open and the opening 9 for heating is fully closed. As a result, no cool air having passed through the evaporator 4 is sent to the heater core 5. The shapes of the film member 22 in this condition are schematically shown in FIGS. 5 and 6.

Figure 6:
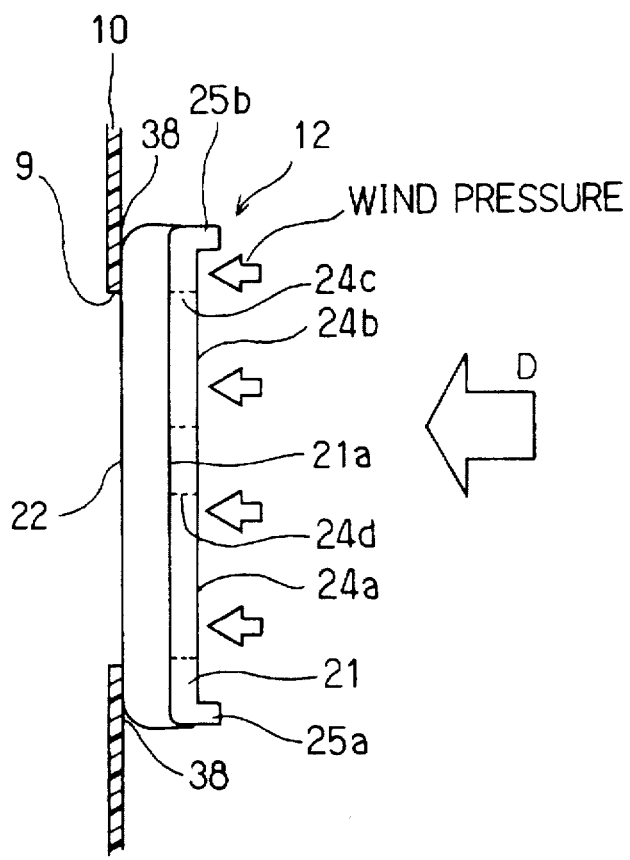
FIG. 6 is a partial structural view illustrating the condition of the film member when the blower is operated.

FIG. 5 shows the condition of the film member 22 when the blower is not operated, and FIG. 6 shows the condition of the film member 22 when the blower is operated.

When the blower is not operated, the film member 22 maintains its natural shape as shown in FIG. 5, so that there is defined a slight gap between a peripheral portion 38 of the opening 8 for cool air and the film member 22. To the contrary, when the blower is operated, the air having passed through the evaporator 4 (as shown by the arrow "D" in FIG. 7) passes through the through holes 24a to 24d of the support member 21 to apply pressure on the inner surface of the film member 22 as shown in FIG. 7. Accordingly, the film member 22 is flexed so as to be expanded leftward as viewed in FIG. 7 by the above air pressure, and the entire periphery of the film member 22 comes into pressure contact with the peripheral portion 38 of the opening 9 for heating.

As a result, the opening 8 for cool air is certainly closed by the film member 22, thus improving the sealing effect in the closed condition.

Therefore, there is no possibility that the air may leak from the opening 9 for heating in the maximum cool mode.

In the maximum cool mode, the air guide plate 34 of the link mechanism 14 is located at an operational position to maximize the opening area at the outlet side of the cool air passage 6 as shown in FIG. 5.

In the maximum cool mode, the end of the sliding door 12 at the cool air side, namely, the end of surface 9a at the air upstream side of sliding door 12 inclines away from the end at warm air side toward the air downstream side of the evaporator 4, so that the cool air from the evaporator 4 can be smoothly sent to the cool air passage 6.

In other words, when sliding door 12 is disposed at right angles with respect to the following direction of the air having passed through the evaporator 4 as shown in FIG. 7, the cool air having passed through the evaporator 4 collides with the sliding door 12 directly, which will increase the airflow resistance, thereby decreasing the amount of air in the maximum cool mode. However, since the sliding door 12 inclines as described above according to the embodiment, and functions as a guide for smoothly sending the cool air having passed through the evaporator 4 to the cool air passage 6, the airflow resistance can be reduced so that the amount of the air in the maximum cool mode.

Next, an operation in an air mixing mode (intermediate temperature control operation) where the cool air having passed through the evaporator 4 is sent to both the cool air passage 6 and the warm air passage 7 by the sliding door 12 will be described with reference to FIG. 8.

In the air mixing mode, the support member 21 and the film member 22 are located at a substantially vertically intermediate position in the case 3 to adjust the ratio in opening area between the opening 8 for cool air and the opening 9 for heating and mix the air having passed through the opening 8 for cool air with the air having passed through the opening 9 for heating, thereby obtaining a desired temperature of conditioned air.

If the air introduced from the cooler opening 8 leaks from between the partition wall 11 and the film member 22 and enters the passage 7 for heating, there may be a problem that a desired mixing ratio cannot be obtained. Conversely, if the air introduced from the opening 9 for heating leaks from between the partition wall 11 and the film member 22 and enters the cool air passage 6, there may be a problem that a desired mixing ratio cannot yet be obtained.

In this embodiment, however, the air having passed through the evaporator 4 blows against the film member 22 through the through holes 24a to 24d, thereby flexing the film member 22 so as to expand it toward the partition wall 11. Accordingly, the film member 22 is brought into pressure contact with the end surface of the partition wall 11 by the above air pressure, thus preventing the occurrence of the above problems certainly.

Accordingly, the ratio in opening area between the cool air passage 6 and the warm air passage 7 can be adjusted by the film member 22 to thereby obtain a desired temperature of conditioned air.

An operation in a maximum hot mode (maximum heating operation) as shown in FIG. 1 is described.

In the maximum hot mode, the support member 21 is located at an uppermost operational position, the opening 8 for cool air is fully closed and the opening 9 for heating is fully open. Thus, all of the air having passed through the evaporator 4 is sent to the warm air passage 7.

Since the condition of the film member 22 in the maximum hot mode is similar to that in the maximum cool mode mentioned above, the description thereof will therefore be omitted herein.

In the maximum cool mode, the air guide plate 34 of the link mechanism 14 is located at an operational position to minimize the opening area at the outlet side of warm air passage 7. In this case, no air flows in the warm air passage 7, however, the warm air slightly heated by radiated heat by heater core 5 (radiated heat by natural convection because of constant circulation of engine cooling water inside heater core 5) mixes into the air mixing chamber 13 as shown with an arrow "K" in FIG. 1, which causes a problem that the cooling capacity deteriorates.

However, according to this embodiment, since the air guide plate 34 is located at an operational position to minimize the opening area at the outlet side of warm air passage 7 and also functions as a block wall for suppressing that the warm air heated by heater core 5 from mixing into air mixing chamber 13, the deterioration of cooling performance caused by radiated heat by heater core 5 can be minimized.

Furthermore, the air guide plate 34 inclines toward upper left (the air downstream side of the air mixing chamber 13 inclines upward) as shown in FIG. 1, so that it can prevent the air passing in the cool air passage 6 from flowing into the warm air passage 7 and simultaneously functions as a guide to lead the air to the passage 15 or 16.

In addition to the above-described operation of sliding door 12, this embodiment has following effects. When the sliding door 12 slides from the operational position in the maximum cool mode to the operational position in the maximum hot mode, a force "F" is applied to the sliding door 12 by the cool air passing through evaporator 4 as shown in FIG. 8.

Figure 8:
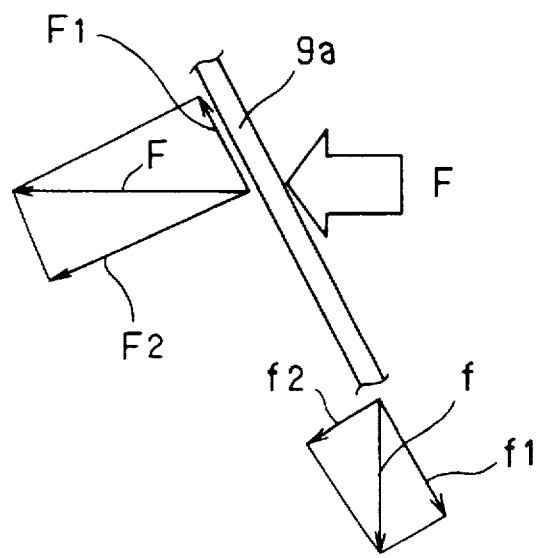
FIG. 8 is a schematic view illustrating the force applied to the sliding door by air pressure in the embodiment.

Since a part of the cool air having passed through the evaporator 4 blows against the surfaces of sliding door 12 and film member 22 at the air upstream side, the force shown with "F" in FIG. 8 is applied thereto. The force "F" is resolved into a force component F1 along the inclining direction of the sliding door 12 and the other force component F2 in the perpendicular direction with respect to F1.

The force component F2 is absorbed by the support pins 32 of the sliding door 12 and the guiding groove 33 inside air conditioning unit 1, so that only the above-mentioned force component F1 still remains and lifts the sliding door 12. In the comparison in FIG. 7, since the sliding door 12 slides in the perpendicular direction, the operation of sliding door 12 is restricted due to the resistance by the self-weight of sliding door 12, when sliding door 12 is moved upward. On the other hand, when the sliding door 12 is moved downward. The operation of sliding door 12 is facilitated by the self-weight of sliding door 12. Thus, there will be a large difference between the operation performances when the sliding door 12 moves upward and downward. As a result, in case sliding door 12 is manually moved, operation performance deteriorates (sliding door 12 cannot be moved upward as easily as it can downward). Even though a driving unit such as a servo motor is employed, it is difficult to tune up the sliding door 12.

According to this invention, however, the operation force for moving the sliding door 12 upward is made smaller by the above-described force component F1, so that the difference between operation performances to move the sliding door 12 upward and downward can be narrower. In this way, the operation performance of the sliding door 12 can be improved.

As described above, the plate-like support member 21 and the film member 22 are movable in a direction parallel to the direction of extension of the plane of the support member 21 and substantially perpendicular to the flow direction of air in the case 3, thereby reducing the operation space for the support member 21 and the film member 22. That is, as compared with a conventional rotary air mixing door, the width of the sliding door 12 in the lateral direction as viewed in FIG. 1 (in the longitudinal direction of the vehicle) can be greatly shortened.

Further, since the link mechanism 14 for operating the support member 21 is located in the space leading from the cool air passage 6 to the air mixing chamber portion 13 in the case 3, the clearance "X" (FIG. 1) between the support member 21 and the evaporator 4 can be minimized as required. Further, since the link mechanism 14 is incorporated in the case 3, it is not necessary to secure a space for installing the link mechanism 14 outside the case 3.

As a result, the overall size of the air conditioner for the vehicle can be greatly reduced.

Further, since the film member 22 is flexed by the air pressure to come into pressure contact with the peripheral portion 38 of the opening 8 or 9 and the partition wall 11, the opening 8 or 9 can be reliably sealed by the film member 22. Further, since the sealing effect of the film member 22 is obtained by the air pressure, a force for operating the support member 21 can be greatly reduced as compared with the case where a packing mounted on the support member 21 slides in pressure contact with the peripheral portion 38 and the partition wall 11. Further, since the support member 21 and the film member 22 are moved in a direction substantially perpendicular to the flow direction of air in the case 3, there is no possibility of an increase in operating force applied to the sliding door 12 irrespective of the direction of movement of the sliding door 12.

According to the above-described embodiment, the surface at the air upstream side of the sliding door 12 constantly inclines toward the air downstream side. However, even if it inclines in any direction at least in the maximum cool mode, the airflow in the maximum cool mode can be increased. For example, in the maximum hot node, it may be able to incline in the opposite direction or perpendicular direction with respect to the flowing direction of the cool air passing through the evaporator 4.

The cool and warm air passages 6 and 7 are arranged vertically (in upward and downward positions, respectively) in this embodiment, however, these passages 6 and 7 may be disposed reversely or even horizontally.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioner for a vehicle having a passenger compartment, comprising:
 a case having an air passage for introducing conditioned air to said passenger compartment,
 said air passage including:
  a warm air passage through which warm air passes,
  a cool air passage, through which cool air passes, formed in parallel with said warm passage,
  a cool air/warm air mixing chamber formed at a downstream side of said cool air passage and said warm air passage, for mixing said cool air passing through said cool air passage and warm air passing through said warm air passage, and
  an air outlet passage formed at a downstream side of said cool air/warm air mixing chamber, for introducing air passing through said cool air/warm air mixing chamber into said passenger compartment;
 a sliding door positioned at an upstream side of said cool air passage and said warm air passage and being slidable in a sliding direction crossing both said cool air passage and said warm air passage to control each amount of air flowing to said warm air passage and air flowing to said cool air passage; and, wherein,
 a heater disposed in said warm air passage, for heating air;

said sliding door slides in the sliding direction at an incline with respect to the flowing direction of cool air in such a manner that an end portion of said sliding door at a side of said cool air passage is located at the most air downstream side, when said cool air passage is open, and the air outlet passage includes a passage communicated with an air outlet for blowing air toward an upper portion of the passenger compartment, said air outlet being provided at an upper side of the cool air passage so as to substantially intersect an extending line of the sliding direction of the sliding door, wherein said sliding door includes:

a support member having an opening;

a film member provided on a downstream side surface of said support member so as to be movable together with said support member, said film member having flexibility; and a guide member for guiding said support member so as to move in said crossing direction; wherein, said film member is adapted to receive air pressure through said opening of said support member to thereby come into pressure contact with a peripheral portion of an opening portion of said warm air passage and a peripheral portion of an opening portion of said cool air passage.

* * * * *